(12) United States Patent
Bhide et al.

(10) Patent No.: US 8,271,479 B2
(45) Date of Patent: Sep. 18, 2012

(54) ANALYZING XML DATA

(75) Inventors: Manish A Bhide, New Delhi (IN); Venkat Chakravarthy, New Delhi (IN); Mukesh K Mohania, Agra (IN); Girish Venkatachaliah, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 316 days.

(21) Appl. No.: 12/624,315

(22) Filed: Nov. 23, 2009

(65) Prior Publication Data

US 2011/0125729 A1   May 26, 2011

(51) Int. Cl.
 *G06F 17/00* (2006.01)
(52) U.S. Cl. ........ 707/716; 707/769; 707/720; 707/722; 707/770
(58) Field of Classification Search .................. 707/716, 707/769, 720, 722, 770
See application file for complete search history.

(56) References Cited

U.S. PATENT DOCUMENTS

| | | | |
|---|---|---|---|
| 7,158,969 B2 | 1/2007 | Dettinger et al. | |
| 7,454,413 B2 | 11/2008 | Lakshminarayanan et al. | |
| 2005/0022115 A1* | 1/2005 | Baumgartner et al. | 715/513 |
| 2005/0210008 A1 | 9/2005 | Tran et al. | |
| 2007/0208705 A1 | 9/2007 | Whitehead | |
| 2007/0226203 A1* | 9/2007 | Adya et al. | 707/4 |
| 2008/0270380 A1 | 10/2008 | Ohrn | |
| 2010/0223276 A1* | 9/2010 | Al-Shameri et al. | 707/769 |
| 2011/0125729 A1* | 5/2011 | Bhide et al. | 707/716 |

FOREIGN PATENT DOCUMENTS

| | | |
|---|---|---|
| EP | 1473639 A1 | 11/2004 |
| EP | 1930816 A1 | 6/2008 |
| WO | WO2007137145 A2 | 11/2007 |

OTHER PUBLICATIONS

Baralis, et al., "Chapter III: Using Mined Patterns for XML Query Answering", p. 39-66, IGI Global, 2008.
Roy, P., et al., "Towards Automatic Association of Relevant Unstructured Content with Structured Query Results", p. 405-412, Proceedings of the 14th ACM International Conference on Information and Knowledge Management, Oct. 31, 2005.
Martin Theobald, The TopX DB&IR Engine, SIGMOD'07, Jun. 11-14, 2007, Beijing, China. ACM 978-1-59593-686-8/07/0006. URL: http://portal.acm.org/citation.cfm?id=1247635.
Martin Theobald, TopX—Adhoc Track and Feedback Task, Max-Planck-Institut für Informatik Saarbrücken, Germany 2006, URL: http://www.springerlink.com/content/u0wh95735745497n/.
PCT International Search Report and Written Opinion, PCT/EP2010/066684, Jan. 27, 2011, 11 pages.

* cited by examiner

*Primary Examiner* — Sana Al Hashemi
(74) *Attorney, Agent, or Firm* — Farrokh E. Pourmirzaie; Edell, Shapiro & Finnan, LLC

(57) ABSTRACT

Embodiments of the invention disclose a method, a system and a computer program product of discovering automated insights in XML data by generating a query result in response to querying data using a query, wherein the data is in a markup language format, and identifying a pattern associated with the query result, wherein the data in the markup language format is used for pattern identification.

12 Claims, 7 Drawing Sheets

```
<?xml version="1.0" encoding="ISO-8859-1"?>

<bookstore>

<book category="COOKING">
   <title lang="en">Everyday Italian</title>
   <author>Giada De Laurentiis</author>
   <year>2005</year>
   <price>30.00</price>
</book>

<book category="CHILDREN">
   <title lang="en">Harry Potter</title>
   <author>J K. Rowling</author>
   <year>2005</year>
   <price>29.99</price>
</book>

<book category="WEB">
   <title lang="en">XQuery Kick Start</title>
   <author>James McGovern</author>
   <author>Per Bothner</author>
   <author>Kurt Cagle</author>
   <author>James Linn</author>
   <author>Vaidyanathan Nagarajan</author>
   <year>2003</year>
   <price>49.99</price>
</book>

<book category="WEB">
   <title lang="en">Learning XML</title>
   <author>Erik T. Ray</author>
   <year>2003</year>
   <price>39.95</price>
</book>

</bookstore>
```

```
for $x in doc ("books.xml")/bookstore/book
where $x /price>30
order by $x /title
return $x /title
```

```
<title lang= "en">Learning xml</title>
<title lang= "en">XQuery Kick Start </title>
```

ANALYZING XML DATA

BACKGROUND OF THE INVENTION

EXtensible Markup Language (hereinafter referred to as XML) is designed to transport and store data. XML has gained importance as a standard for data encoding and exchange over internet. With the increase in XML applications such as e-business transactions, XML middleware systems, effective and efficient delivery of XML data has also become important in recent times. Further, in recent years XML has gained popularity for representing semi-structured data as more and more data in many business areas are storing, and managing data in textual, image and multimedia formats. The businesses include healthcare industry, scientific data management and analysis industry, pharmaceutical industry and retail industry.

Analysis of XML data has, gained importance for business analytics in the data of variety of industries for evolving business decisions and strategies for example, such as, forecasting, prediction, trend analysis and resource management.

Normally, pre-processing and post-processing are desired steps for mining/analyzing XML data. One such common pre-processing step is to convert XML data format to relational data format, and subsequently use conventional data analytics tools to gain insights in the XML data.

Another conventional way to mine XML data is to use an XML mining tool directly on the XML data. In such methodologies, 'XQuery' is used as a mechanism to mine association rules from XML data. XQuery is a query and functional programming language that is designed to query collections of XML data. XQuery 1.0 was developed by the XML Query working group of the W3C, the World Wide Web Consortium (W3C), which is the main international standards organization for the World Wide Web (abbreviated WWW or W3).

SUMMARY OF THE INVENTION

Principles of the embodiments of the invention disclose a method, a system and a computer program product of discovering automated insights in XML data by generating a query result in response to querying data using a query, wherein the data is in a markup language format, and identifying a pattern associated with the query result, wherein the data in the markup language format is used for pattern identification. The markup language of the data is preferably in an eXtensible Markup Language (XML). The query or the query result is at least one of an XQuery or a Structured Query Language eXtensible Markup Language (SQL-XML). The pattern includes at least one of a positive correlation and a negative correlation.

Embodiments of the invention further include generating a graph, preferably the graph including at least one of an entity graph, a directed acyclic graph, a directed graph, a cyclic graph, a connected graph and an undirected graph, in response to the query result, wherein the data in the markup language format is used to generate the graph, processing a plurality of schemas, if the data has the plurality of schemas, and generating the graph. The graph includes a first set of entities included in the query result, a second set of entities not included in the query result and being included in the data in the markup language format, and each of the entities having a path to at least one entity from the first set of entities, and a plurality of paths joining entities identified in the first set of entities and the second set of entities.

Embodiments of the invention further include generating at least one interpretation for the pattern, wherein the pattern is a correlation between a first entity selected from the first set of entities and a second entity selected from the second set of entities. Embodiments of the invention further include the step of computing a score from a set of pre-defined parameters. The pre-defined parameter is at least one of a path value and a path uniqueness value. The path value corresponds to a number of paths between a specific set of entities and the path uniqueness value corresponds to a number of entities on a specific path.

Embodiments of the invention further include computing a score for each entity of the second set of entities with respect to the first set of entities, and ordering the entities from the second set of entities in response to computing the score, resulting in an ordered second set of entities, and computing an optimal entity by recursively computing a plurality of scores for entities from the ordered second set of entities, and the computed optimal entity corresponds to the at least one pattern. Other embodiments are also disclosed.

BRIEF DESCRIPTION OF THE DRAWINGS

Embodiments of the invention are described in detail below, by way of example only, with reference to the following schematic drawings, where:

FIG. 2A shows an exemplary XML document;

FIG. 2B depicts an exemplary XQuery used to query the XML document in FIG. 2A;

FIG. 2C shows exemplary result of XQuery of FIG. 2B;

DETAILED DESCRIPTION OF THE INVENTION

Figure 1A:
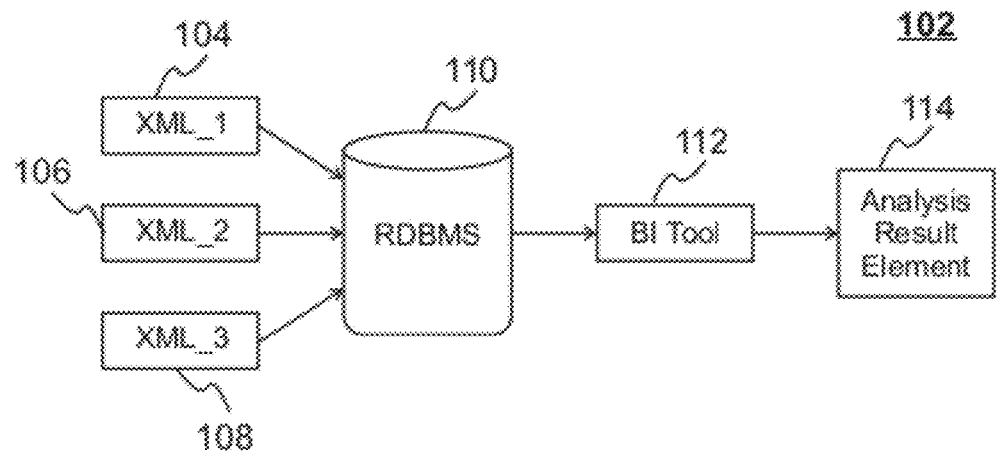
FIG. 1A, and FIG. 1B show schematics of methods of analyzing XML data as found in prior art.

Embodiments of the invention describe, in an example embodiment, analysis of XML data. The object of analysis is to get insights into XML data, which in turn can be harnessed as actionable results to improve productivity, sales, better marketing or any such activity to achieve enhancement in one or more goals of an organization. FIG. 1A shows a prior art schematic 102 of a currently existing technique of analyzing XML data. The schematic 102 shows multiple XML documents such as XML_1 104, XML_2 106, and XML_N 108. The schematic 102 also shows a Relational Database Management System (RDBMS) 110, a Business Intelligence (BI) Tool 112 and an analysis result element 114. The schematic 102 depicts XML data from multiple XML documents such as XML_1 104, XML_2 106, and XML_N 108 being transformed into a relational format in an RDBMS 110, which in turn is used as the source to mine or analyze using the BI tool 112.

Figure 1B:
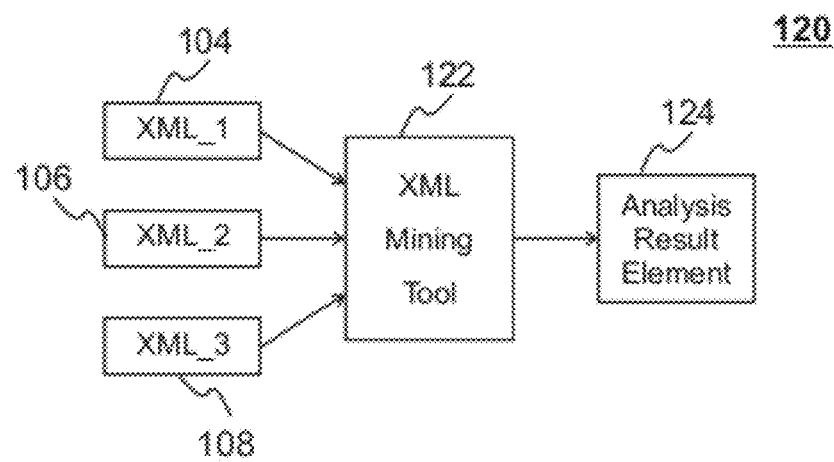

FIG. 1B shows a prior art schematic 120 of yet another currently existing technique of analyzing XML data. The schematic 120 shows multiple XML documents such as XML_1 104 of FIG. 1A, XML_2 106 of FIG. 1A, and XML_N 108 of FIG. 1A. The schematic 120 also shows an XML Mining Tool 122, and an analysis result element 124. The schematic 120 depicts XML data from multiple XML documents such as XML_1 104, XML_2 106, and XML_N 108 being used in its native XML form as the source to mine or analyze by the XML Mining Tool 122.

FIG. 2A shows an exemplary XML document 200, "books.xml", found in prior art. The XML document 200 enlists the titles, author, year, price and the category of four books as an example.

FIG. 2B depicts an exemplary XQuery 210, found in prior art, used to query the XML document, "books.xml", illustrated in FIG. 2A. The XQuery 210 enlists XQuery expressions that fetch books having a price tag that is greater than $30 and present all books to a user having a price tag greater than $30 ordered by title of the book.

FIG. 2C shows an exemplary result 220, found in prior art, of the results associated by running the XQuery illustrated in FIG. 2B.

Figure 3:
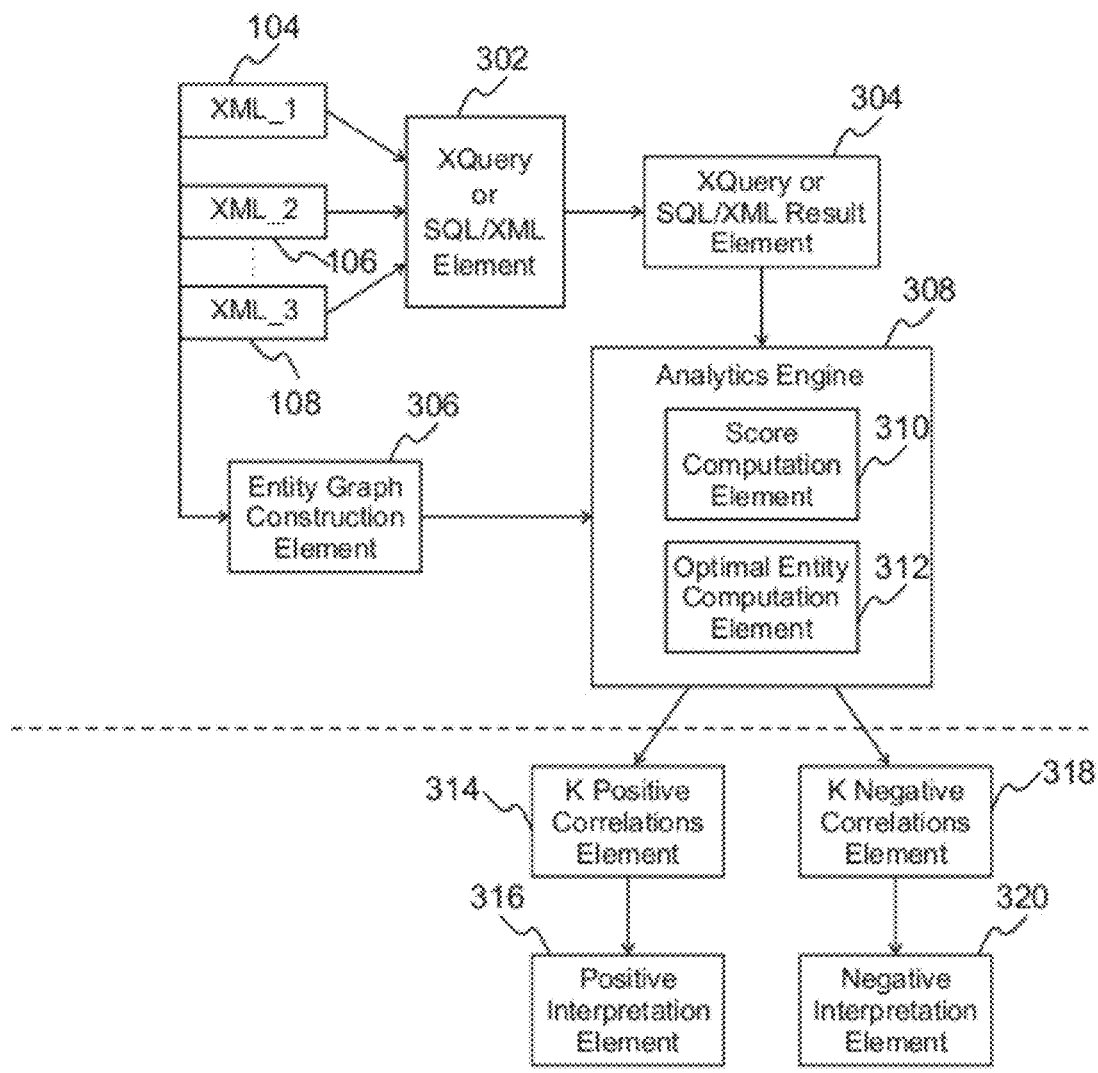
FIG. 3 depicts a high-level schematic illustrating a system for analyzing XML data according to an example embodiment of the invention.

FIG. 3 depicts a high-level schematic 300 illustrating a system for analyzing XML data according to an example embodiment of the invention. The schematic 300 includes the input XML data, which could be a multiple set of XML documents XML_1 104 XML_2 106 and XML_N 108 as illustrated in FIG. 1A. The schematic includes an XQuery or SQL/XML element 302, an XQuery or SQL/XML result element 304, an analytics engine 308 and a graph construction element 306. The analytics engine 308 further includes a score computation element 310 and an optimal entity computation element 312.

The schematic 300 further includes a "K positive correlations element" 314 with associated positive interpretation element 316, and a "K negative correlations element" 318 with associated negative interpretation element 320.

XQuery or SQL/XML element 302 uses multiple XML data sources, such as, for example, XML_1 104, XML_2 106 and XML_N 108, and a query result is produced in XQuery or SQL/XML result element 304. Analytics engine 308 uses the XQuery result or the SQL/XML result and also uses a graph, obtained from the graph construction element 306 to compute scores and also to compute optimal entity. The graph construction element 306 makes use of the schemas of different XML documents. If the schema is the same, then building a graph is relatively simpler. However, if the schemas for multiple XML documents are different, then pre-processing becomes complex. In such as case, domain experts may need to identify the entities in the different XML schemas, semi-automatically correlate the schemas and the relationship thus identified need to be validated by the domain experts. An example of schema mapping is a "branch_id" in "Branch_info.xml" for a banking scenario could be same as "home_branch_id" in "Customer_info.xml".

Each entity represents a "node" in the graph and two entities are connected by an edge if they belong to the same XML schema and have a path between them in the schema. Alternatively, they may belong to different schemas and may be related to each other, as suggested or validated by the domain expert.

Once the graph is constructed using the graph construction element 306, and the nodes, the edges and the paths are identified, the analytics engine 308 uses the graph created. The graph includes a first set of entities included in the query result, a second set of entities not included in the query result and being included in the data in the markup language format, and each of the entities having a path to at least one entity from the first set of entities, and a plurality of paths joining entities identified in the first set of entities and the second set of entities. At least one interpretation is generated for the pattern, wherein the pattern is a correlation between a first entity selected from the first set of entities and a second entity selected from the second set of entities.

The score computation element 310 of the analytics engine 308 computes a score from a set of pre-defined parameters. The pre-defined parameter is at least one of a path value and a path uniqueness value. The path value corresponds to a number of paths between a specific set of entities and the path uniqueness value corresponds to a number of entities on a specific path.

The optimal entity computation element 312 of the analytics engine 308 computes a score for each entity of the second set of entities with respect to the first set of entities. The optimal entity computation element 312 then orders the entities from the second set of entities in response to computing the score, resulting in an ordered second set of entities. The optimal entity computation element 312 then computes an optimal entity by recursively computing a plurality of scores for entities from the ordered second set of entities, and the computed optimal entity corresponds to the at least one pattern.

The "K positive correlations element" 314 computes a node or a value from the graph that is highly relevant or correlated to the XQuery result. The associated positive interpretation element 316 describes the correlation between the two entities. The "K negative correlations element" 318 calculates a node or a value from the graph that is least relevant or correlated to the XQuery result. The associated negative interpretation element 320 describes the correlation between the two entities.

Figure 4:
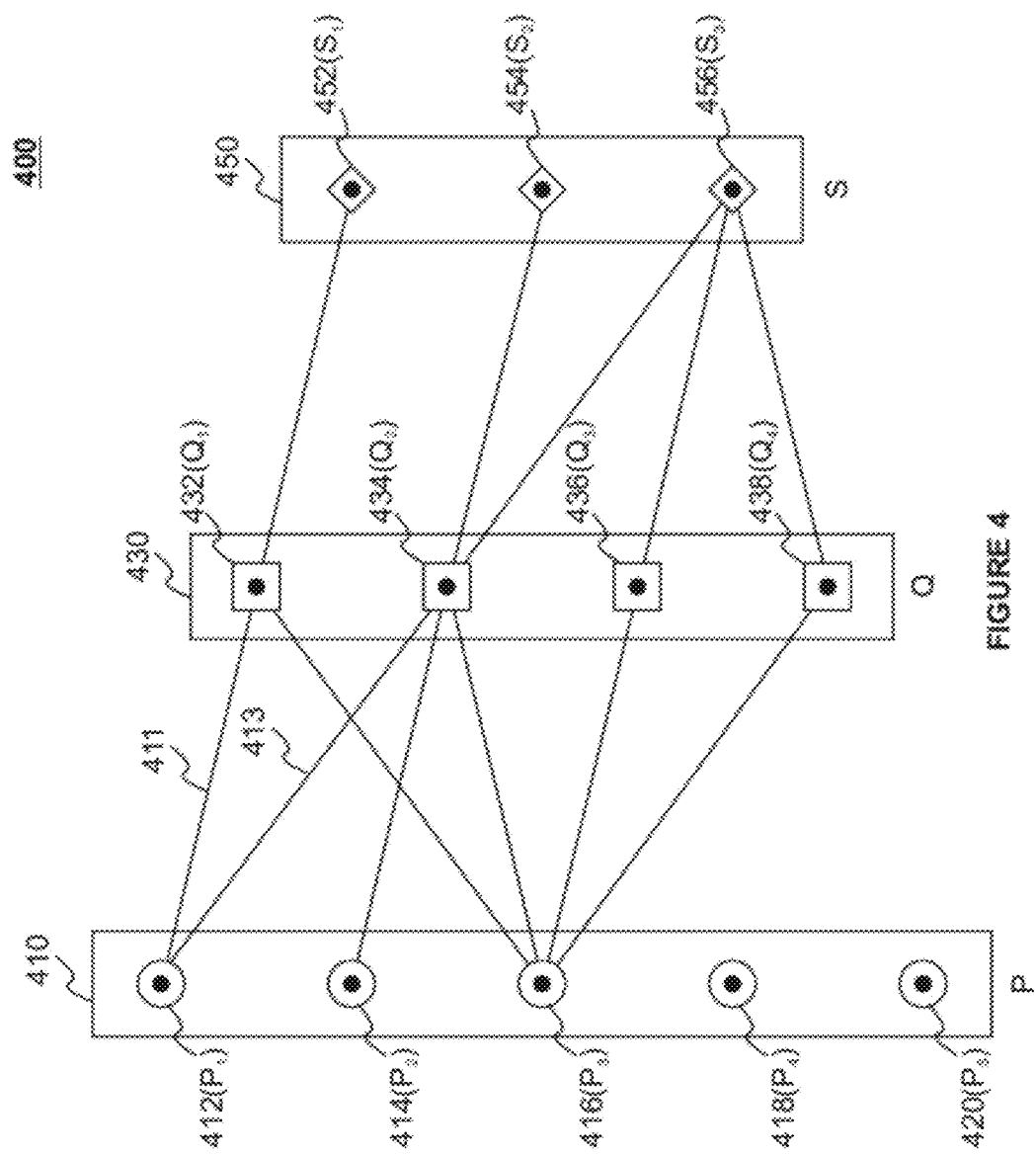
FIG. 4 shows an exemplary schematic of a graph in accordance with an example embodiment of the invention.

FIG. 4 shows an exemplary schematic 400 of a graph in accordance with an embodiment of the invention. In an exemplary graph, there are three dimensions P 410, Q 430, and S 450 having an interpretation P→Q→S. Dimension P 410 has five nodes p1 412, p2 414, p3 416, p4 418 and p5 420, but only three nodes p1 412, p2 414 and p3 416 out of possible five are in the query result. Dimension Q 430 has four possible nodes q1 432, q2 434, q3 436 and q4 438. Dimension S 450 has three possible nodes s1 452, s2 454 and s3 456. Node p1 412 is connected in an exemplary manner to node q2 432 via 411 and thus 411 indicates a path. Similarly 413 is an indicator of path between node p1 412 and node q2 434. As there is no connecting line between, as an example, node p1 412 and q3 436, it can be concluded that there is no path between nodes p1 412 and q3 436. The score computation element 310 of FIG. 3 computes a score from a set of pre-defined parameters. The pre-defined parameter is at least one of a path value and a path uniqueness value. The path value corresponds to a number of paths between a specific set of entities and the path uniqueness value corresponds to a number of entities on a specific path.

Let dimension P={p1, p2, p3, p4, p5} and XQuery Result: P'={p1, p2, p3}

An exemplary score value calculation in the score computation element 310 of FIG. 3, can be computed using the formula:

$$\text{Score}(S',P') = \Sigma \text{path value}(S',p_i) \times \text{path uniqueness value}(p_i)$$

for all $p_i$ belonging to P'

An exemplary path value calculation can be computed using the formula:

$$\text{path value}(S',p_i) = \text{number of paths from } S' \text{ to } p_i$$

An exemplary path uniqueness value calculation can be computed using the formula:

Path uniqueness$(p_i) = 1 + \log(|S|/|S'|)$, where $|S'|$ = number of nodes in $S$ which have a path to $p_i$;

An exemplary optimal entity computation element 312 of FIG. 3 calculates the optimal entity for positive correlation using the steps described below:
For an interpretation (P→S), the maximum score that a node $p_i$ in P 410 can get amongst all nodes in S 450 is pre-computed. The query result is then ordered by a maximum score. Let p1, p2 . . . pN be such order.
    Let $p_i$=p1
Forward Phase
    Propagate all paths from $p_i$ to S.
    Compute partial scores of nodes in S. Let $S_{max}$ by maximum partial score
    For index=i+1 to N, if sum (max_score($p_{index}$))<$S_{max}$ then stop.
    Else advance $p_i$
Backward Phase
    For all nodes in S with partial score>0, find paths to P' i.e., complete score
    Return node with highest score.
This node is a positive correlation as is calculated in K Positive correlations element 314 of FIG. 3. An associated positive interpretation is depicted in positive interpretation element 316.

Figure 5:
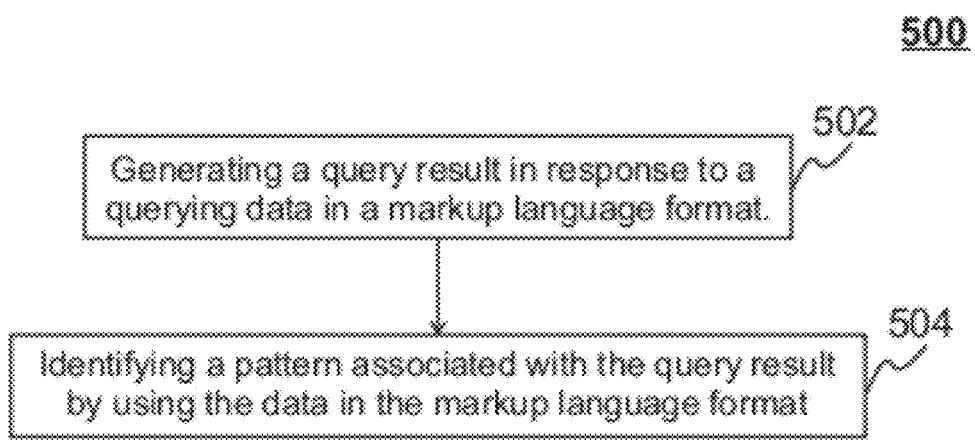
FIG. 5 shows a flow chart for analyzing XML data as disclosed in FIG. 3.

An exemplary optimal entity computation element 312 of FIG. 3 calculates the optimal entity for negative correlation using the steps described below:
For an interpretation (P→S)
Consider only those nodes which have non-zero score. This removes irrelevant nodes from result computation.
    Find minimum non-zero score for each node $p_i$ in P 410
    Order nodes in result set in increased value of minimum score
    For each node $p_i$ in P 410
    Perform Forward Phase of $p_i$ in P 410
    Perform Backward Phase of all nodes with partial score>0
Stopping condition:
    If least full score is <score of $p_{index}$+1
Else advance $p_i$ FIG. 5 shows a flow chart illustrating a general method 500 for analyzing XML data according to an embodiment of the invention. Step 502 generates a query result in response to querying data using a query, wherein the data is in a markup language format. Step 504 depicts identifying a pattern associated with the query result, wherein the data in the markup language format is used for pattern identification.

Figure 6:
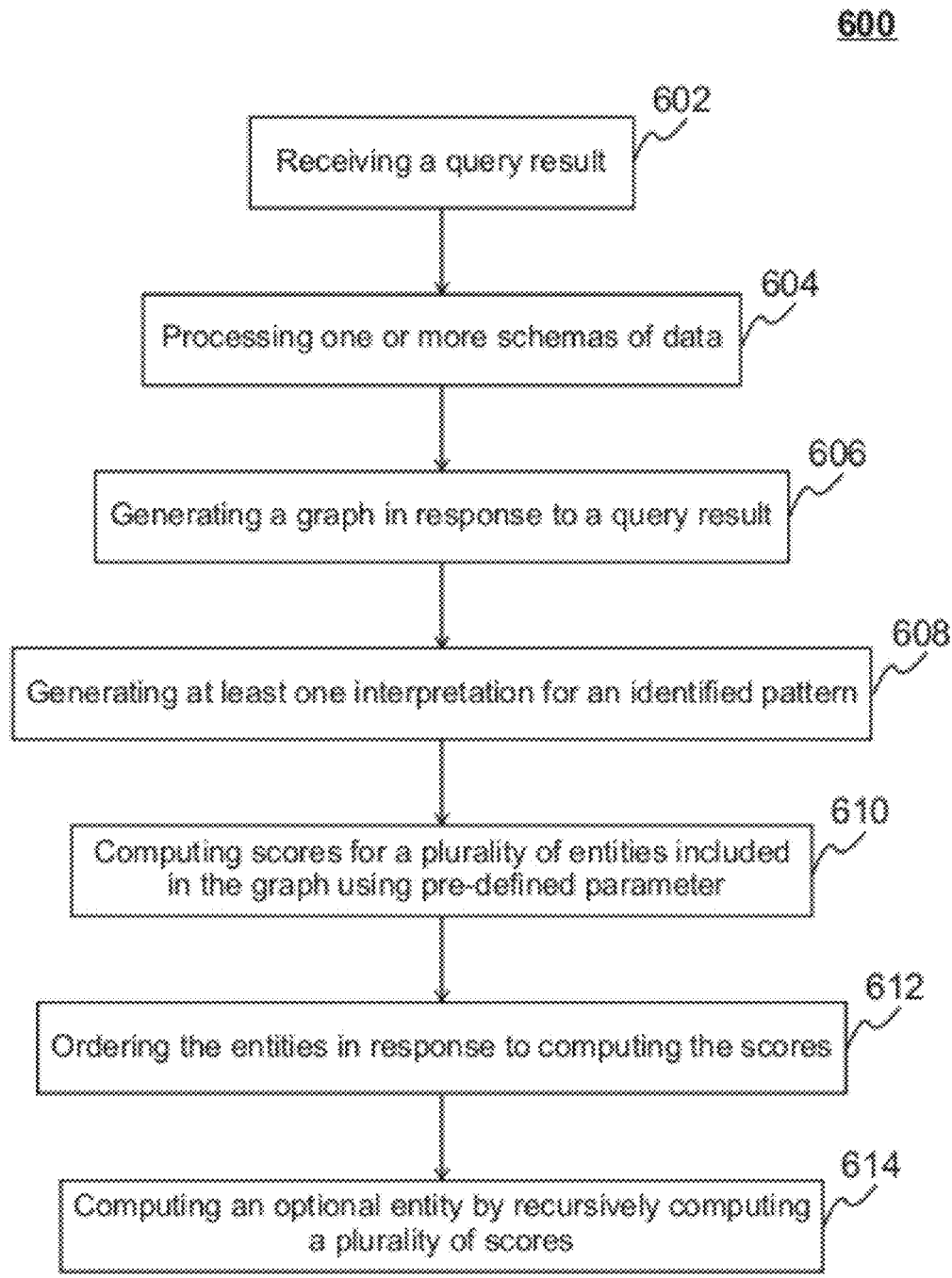
FIG. 6 shows a flow chart for analyzing a query result obtained in accordance with FIG. 5 and the system as disclosed in FIG. 3.

FIG. 6 shows a flow chart illustrating a method 600 for analyzing a query result obtained in accordance with FIG. 5 and the system as disclosed in FIG. 3. Step 602 depicts receiving a query result in response to querying data using a query, wherein the data is in a markup language format. Step 604 depicts processing a plurality of schemas, if the data has the plurality of schemas. Step 606 depicts generating the graph in response to the query result. In one embodiment the steps 606 and step 608 could be performed only once. In a further embodiment, the steps 606 and 608 can be performed separately, in which event the method would flow from step 604 to step 610, using the results obtained from steps 606 and 608. Step 608 depicts generating at least one interpretation for the pattern, wherein the pattern is a correlation between a first entity selected from the first set of entities and a second entity selected from the second set of entities. Step 610 shows computing scores for a plurality of entities of the first set of entities with respect to a target set of entities, from a set of pre-defined parameters wherein the target set is selected from the second set of entities. Step 612 depicts ordering the entities from the first set of entities in response to computing the scores, resulting in an ordered first set of entities. Step 614 shows computing an optimal entity by recursively computing a plurality of scores for entities from the ordered first set of entities and the target set of entities, and the computed optimal entity corresponds to the at least one pattern.

Figure 7:
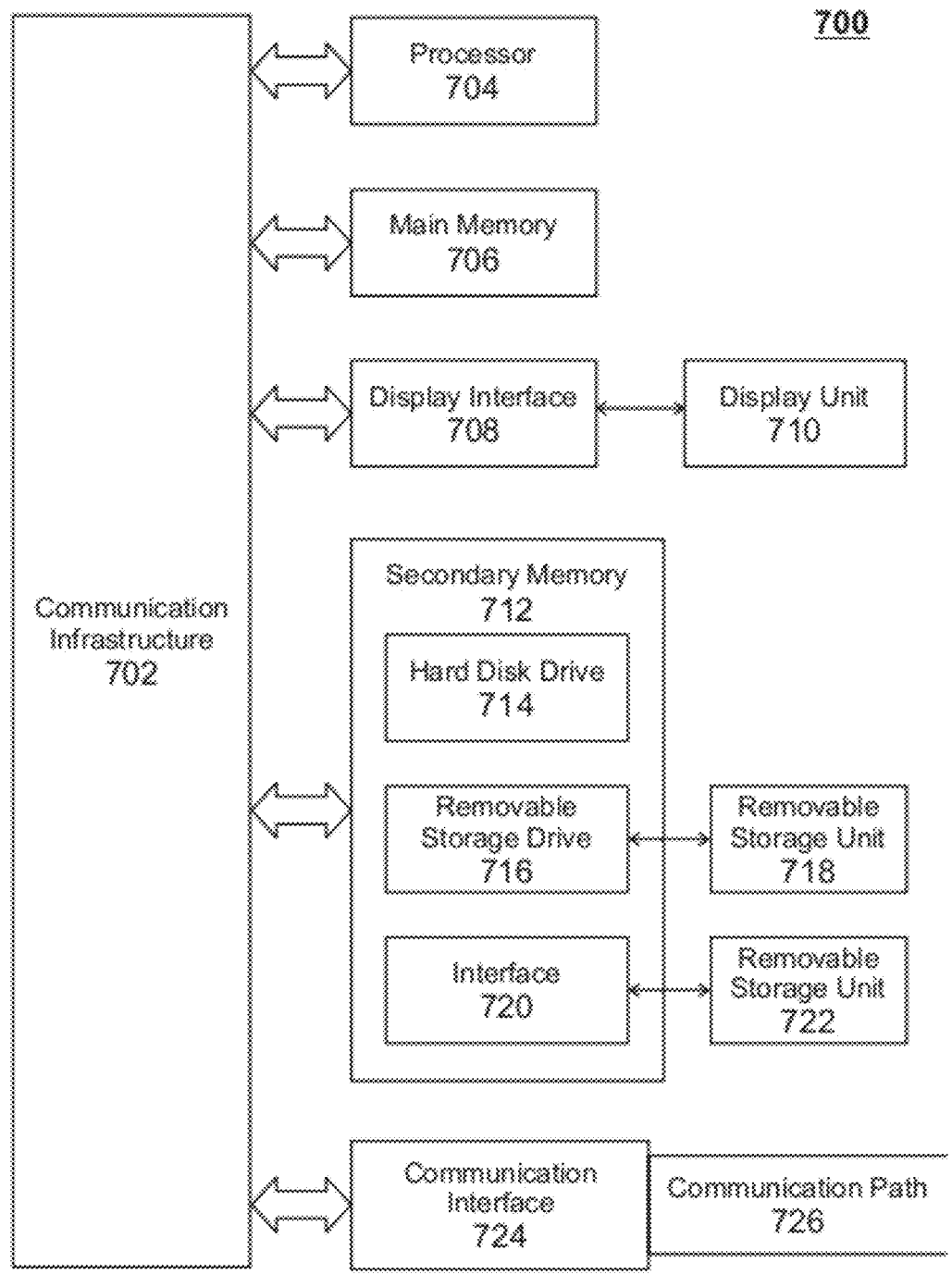
FIG. 7 illustrates an exemplary embodiment of a computer system used for analyzing XML data in accordance with a system as disclosed in FIG. 3.

FIG. 7 illustrates an exemplary embodiment of a computer system used for analyzing XML data in accordance with a system as disclosed in FIG. 3. The computer system 700 can also be used to perform the steps described in either FIG. 5 or FIG. 6 or both. The computer system 700 includes a processor 704. It should be understood although FIG. 7 illustrates a single processor, one skilled in the art would appreciate that more than one processor can be included as needed. The processor 704 is connected to a communication infrastructure 702 (for example, a communications bus, cross-over bar, or network) where the communication infrastructure 704 is configured to facilitate communication between various elements of the exemplary computer system 700. Various software embodiments are described in terms of this exemplary computer system. After reading this description, it will become apparent to a person of ordinary skill in the relevant art(s) how to implement the invention using other computer systems and/or computer architectures.

Exemplary computer system 700 can include a display interface 708 configured to forward graphics, text, and other data from the communication infrastructure 702 (or from a frame buffer not shown) for display on a display unit 710. The computer system 700 also includes a main memory 706, which can be random access memory (RAM), and may also include a secondary memory 712. The secondary memory 712 may include, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a manner well known to those having ordinary skill in the art. The removable storage unit 718, represents, for example, a floppy disk, magnetic tape, optical disk, etc. which is read by and written to by the removable storage drive 716. As will be appreciated, the removable storage unit 718 includes a computer usable storage medium having stored therein computer software and/or data.

In exemplary embodiments, the secondary memory 712 may include other similar means for allowing computer programs or other instructions to be loaded into the computer system. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to the computer system 700.

The computer system 700 may also include a communications interface 724. The communications interface 724 allows software and data to be transferred between the computer system and external devices. Examples of the communications interface 724 may include a modem, a network interface (such as an Ethernet card), a communications port, a PCM-CIA slot and card, etc. Software and data transferred via the communications interface 724 are in the form of signals which may be, for example, electronic, electromagnetic, optical, or other signals capable of being received by communications interface 724. These signals are provided to the communications interface 724 via a communications path (that is, channel) 726. The channel 726 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 706 and the secondary memory 712, the removable storage drive 716, a hard disk installed in the hard disk drive 714, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also referred to herein as computer control logic) are stored in the main memory 706 and/or the secondary memory 712. Computer programs may also be received via the communications interface 724. Such computer programs, when executed, can enable the computer system to perform the features of exemplary embodiments of the present invention as discussed herein. In particular, the computer programs, when executed, enable the processor 704 to perform the features of the computer system 700. Accordingly, such computer programs represent controllers of the computer system.

Embodiments of the invention further provide a storage medium tangibly embodying a program of machine-readable instructions executable by a digital processing apparatus to carry out a method of analyzing data as described in the various embodiments set forth above and described in detail.

The described techniques may be implemented as a method or an apparatus/system involving software, firmware, micro-code, hardware such as logic, memory and/or any combination thereof. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

Although exemplary embodiments of the invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

What is claimed is:

1. A method for analyzing data, the method comprising:
generating a query result in response to querying data using a query, wherein the data is in a markup language format and is obtained from at least one data source;
identifying a pattern associated with the query result, wherein the data in the markup language format is used for pattern identification, and wherein the pattern associated with the query results comprises at least one of a positive correlation and a negative correlation;
generating a graph in response to the query result, wherein the data in the markup language format is used to generate the graph, wherein the graph comprises at least one of an entity graph, a directed acyclic graph, a directed graph, a cyclic graph, a connected graph and an undirected graph, and wherein the graph includes:
a first set of entities included in the query result;
a second set of entities not included in the query result and being included in the data in the markup language format, and each of the entities having a path to at least one entity from the first set of entities; and
a plurality of paths joining entities identified in the first set of entities and the second set of entities; and
generating at least one interpretation for the pattern, wherein the pattern is a correlation between a first entity selected from the first set of entities and a second entity selected from the second set of entities.

2. A system of analyzing data, the system comprising at least one processor and at least one memory, wherein the processor is adapted to:
- generate a query result in response to querying data using a query, wherein the data is in a markup language format;
- identify a pattern associated with the query result, wherein the data in the markup language format is used for pattern identification;
- process a plurality of schemas, if the data includes the plurality of schemas;
- generate a graph in response to the query result, wherein the graph comprises at least one of an entity graph, a directed acyclic graph, a directed graph, a cyclic graph, a connected graph and an undirected graph and the data in the markup language format is used to generate the graph, and the graph includes:
  - a first set of entities included in the query result;
  - a second set of entities not included in the query result and being included in the data in the markup language format, and each of the entities having a path to at least one entity from the first set of entities; and
  - a plurality of paths joining entities identified in the first set of entities and the second set of entities; and
- generate at least one interpretation for the pattern, wherein the pattern is a correlation between a first entity selected from the first set of entities and a second entity selected from the second set of entities.

3. A method for analyzing data, the method comprising:
- generating a query result in response to querying data using a query, wherein the data is in a markup language format; and
- identifying a pattern associated with the query result, wherein the data in the markup language format is used for pattern identification;
- wherein the method is carried out by a digital processing apparatus executing a program of machine-readable instructions stored in a tangible storage medium, wherein the markup language format of the data is eXtensible Markup Language (XML), wherein one selected from the set of the query and the query result comprising at least one of an XQuery or a Structured Query Language/eXtensible Markup Language (SQL-XML), wherein the pattern comprises at least one of a positive correlation and a negative correlation, wherein said method further comprises:
  - processing a plurality of schemas, if the data has the plurality of schemas;
  - generating a graph in response to the query result, wherein the graph comprises at least one of an entity graph, a directed acyclic graph, a directed graph, a cyclic graph, a connected graph and an undirected graph, and the data in the markup language format is used to generate the graph, and the graph includes:
    - (I) a first set of entities included in the query result;
    - (II) a second set of entities not included in the query result and being included in the data in the markup language format, and each of the entities having a path to at least one entity from the first set of entities; and
    - (III) a plurality of paths joining entities identified in the first set of entities and the second set of entities;
  - generating at least one interpretation for the pattern, wherein the pattern is a correlation between a first entity selected from the first set of entities and a second entity selected from the second set of entities;
  - computing a score from a set of pre-defined parameters, wherein the pre-defined parameters include at least one of a path value and a path uniqueness value, and wherein the path value corresponds to a number of paths between a specific set of entities and the path uniqueness value corresponds to a number of entities on a specific path;
  - computing a score for each entity of the second set of entities with respect to the first set of entities;
  - ordering the entities from the second set of entities in response to computing the score, resulting in an ordered second set of entities; and
  - computing an optimal entity by recursively computing a plurality of scores for entities from the ordered second set of entities, and the computed optimal entity corresponds to the at least one pattern.

4. The method of claim 1, wherein the markup language format of the data is eXtensible Markup Language (XML).

5. The method of claim 1, wherein one selected from the set of the query and the query result comprising at least one of an XQuery or a Structured Query Language/eXtensible Markup Language (SQL-XML).

6. The method of claim 1, further comprising:
- if the data includes the plurality of schemas,
- processing a plurality of schemas, and
- generating the graph, using the processed plurality of schemas.

7. The method of claim 1, further comprising:
- computing a score from a set of pre-defined parameters.

8. The system of claim 2, wherein the markup language format of the data is eXtensible Markup Language (XML), and wherein one selected from the set of the query and the query result comprising at least one of an XQuery or a Structured Query Language/eXtensible Markup Language (SQL-XML), and
- wherein the pattern associated with the query result comprises at least one of a positive correlation and a negative correlation.

9. The system of claim 2, wherein the processor is further adapted to:
- compute a score from a set of pre-defined parameters, wherein the pre-defined parameters include at least one of a path value and a path uniqueness value, and wherein the path value corresponds to a number of paths between a specific set of entities and the path uniqueness value corresponds to a number of entities on a specific path;
- compute a score for each entity of the second set of entities with respect to the first set of entities;
- order the entities from the second set of entities in response to computing the score, resulting in an ordered second set of entities; and
- compute an optimal entity by recursively computing a plurality of scores for entities from the ordered second set of entities, and the computed optimal entity corresponds to the at least one pattern.

10. The method of claim 7, wherein the pre-defined parameter comprises at least one of a path value and a path uniqueness value.

11. The method of claim 10, wherein the path value corresponds to a number of paths between a specific set of entities and the path uniqueness value corresponds to a number of entities on a specific path.

12. The method of claim 10, further comprising:
- computing a score for each entity of the second set of entities with respect to the first set of entities;
- ordering the entities from the second set of entities in response to computing the score, resulting in an ordered second set of entities; and
- computing an optimal entity by recursively computing a plurality of scores for entities from the ordered second set of entities, and the computed optimal entity corresponds to the at least one pattern.

* * * * *